US005650725A

United States Patent [19]
Powell et al.

[11] Patent Number: 5,650,725
[45] Date of Patent: Jul. 22, 1997

[54] MAGNETIC IMAGER AND METHOD

[75] Inventors: James Powell, Shoreham; Morris Reich, Kew Garden Hills; Gordon Danby, Wading River, all of N.Y.

[73] Assignee: Associated Universities, Inc., Washington, D.C.

[21] Appl. No.: 523,109

[22] Filed: Sep. 1, 1995

[51] Int. Cl.$^6$ .................................................. G01V 3/11
[52] U.S. Cl. .................................................. 324/326
[58] Field of Search ................................. 324/326–329, 324/66, 67, 239, 243, 225; 340/540, 551, 568, 572

[56] References Cited

U.S. PATENT DOCUMENTS

| | | | |
|---|---|---|---|
| 3,617,865 | 11/1971 | Hakata | 324/326 |
| 3,889,249 | 6/1975 | Bennett, Jr. et al. | 324/243 |
| 4,070,625 | 1/1978 | Harpster | 324/239 |
| 4,573,016 | 2/1986 | Nakamura et al. | 324/464 |
| 4,641,566 | 2/1987 | Pomeroy | 89/1.13 |
| 4,712,094 | 12/1987 | Bolson, Sr. | 340/572 |
| 4,767,237 | 8/1988 | Cosman et al. | 405/157 |
| 4,894,617 | 1/1990 | Urbani | 324/239 |
| 4,990,850 | 2/1991 | Votruba | 324/243 |
| 5,051,034 | 9/1991 | Goodman | 405/167 |
| 5,116,654 | 5/1992 | Cosman et al. | 428/77 |
| 5,122,750 | 6/1992 | Rippingale et al. | 324/326 |
| 5,150,056 | 9/1992 | Wilcock | 324/326 |
| 5,296,807 | 3/1994 | Kousek et al. | 324/326 |
| 5,339,023 | 8/1994 | Kruchowy et al. | 324/326 |
| 5,361,029 | 11/1994 | Rider et al. | 324/326 |
| 5,406,259 | 4/1995 | Manneschi | 324/239 |
| 5,493,517 | 2/1996 | Frazier | 324/243 |

OTHER PUBLICATIONS

IEEE Transactions on Magnetics, vol. 27, No. 2, Mar. 1991, by Harold Weinstock, "A Review of Squid Magnetometry".
IEEE Transactions on Magnetics, vol. 29, No. 2, Mar. 1989, by S. Evanson, et al., "A Comparison of the Performance of Planar and conventional Second–order Gradiomators Coupled to a SQUID for the NDT of Steel Plates", pp. 1200–1203.

*Primary Examiner*—Sandra L. O'Shea
*Assistant Examiner*—Roger Phillips
*Attorney, Agent, or Firm*—M. C. Bogosian

[57] ABSTRACT

A magnetic imager 10 includes a generator 18 for practicing a method of applying a background magnetic field over a concealed object, with the object being effective to locally perturb the background field. The imager 10 also includes a sensor 20 for measuring perturbations of the background field to detect the object. In one embodiment, the background field is applied quasi-statically. And, the magnitude or rate of change of the perturbations may be measured for determining location, size, and/or condition of the object.

18 Claims, 13 Drawing Sheets

MAGNETIC IMAGER AND METHOD

This invention was made with Government support under contract number DE-AC02-76CH00016, between the U.S. Department of Energy and Associated Universities, Inc. The Government has certain rights in the invention.

BACKGROUND OF THE INVENTION

The present invention relates generally to detection of concealed or buried objects, and, more specifically, to detection of structural rebars inside concrete, and underground pipes for example.

At present, determining the condition of steel rebars inside reinforced structures like bridge decks, pavements, dams, and buildings is not practical. The rebars may be corroded, cracked, poorly welded together, wrongly spaced, or even missing. Lacking accurate, quantitative information on their location, it is impossible to realistically assess structural integrity and remaining service life. The knowledge of rebar condition would allow engineers to realistically prioritize repair and replacement activities, and detect and fix deterioration before more serious and expensive degradation occurs.

Similarly, at present it is very difficult, and in many cases not possible, to accurately locate and determine from the surface the condition of underground pipes for water, gas, and sewers. This is particularly true in cities, where numerous pipes often run under the same street. Many of these pipes have been seriously weakened by corrosion, or are leaking at their joints.

The ability to map underground pipes from the surface and pinpoint joints and local corrosion would be of great value to agencies and contractors by enabling repairs to be made quickly, with minimal disruption to traffic, and by preventing serious accidents or situations involving long periods without service.

Conventional techniques exist for magnetically locating underground pipes. For example, magnetic particles may be imbedded in pipes, or magnetic marking tapes may be buried with the pipe for allowing subsequent magnetic detection thereof using conventional magnetometers. In another prior art device, a transmitter is coupled to a known end of one or more underground pipes and generates different frequency signals therein which are picked up by a receiver at a remote location for locating the pipes. And, in a typical metal detector, a high frequency AC magnetic field is transmitted into the ground for being inductively coupled with a concealed metal object which in turn changes the resonance frequency to indicate location of the object.

Conventional detectors are limited in their ability to detect concealed objects. Furthermore, it is desirable to additionally determine the condition of the concealed objects to determine degradation thereof for example.

SUMMARY OF THE INVENTION

A magnetic imager includes a generator practicing a method of applying a background magnetic field over a concealed object, with the object being effective to locally perturb the background field. The imager also includes a sensor for measuring perturbations of the background field to detect the object. In one embodiment, the background field is applied quasi-statically. And, the magnitude or rate of change of the perturbations may be measured for determining location, size, and/or condition of the object.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
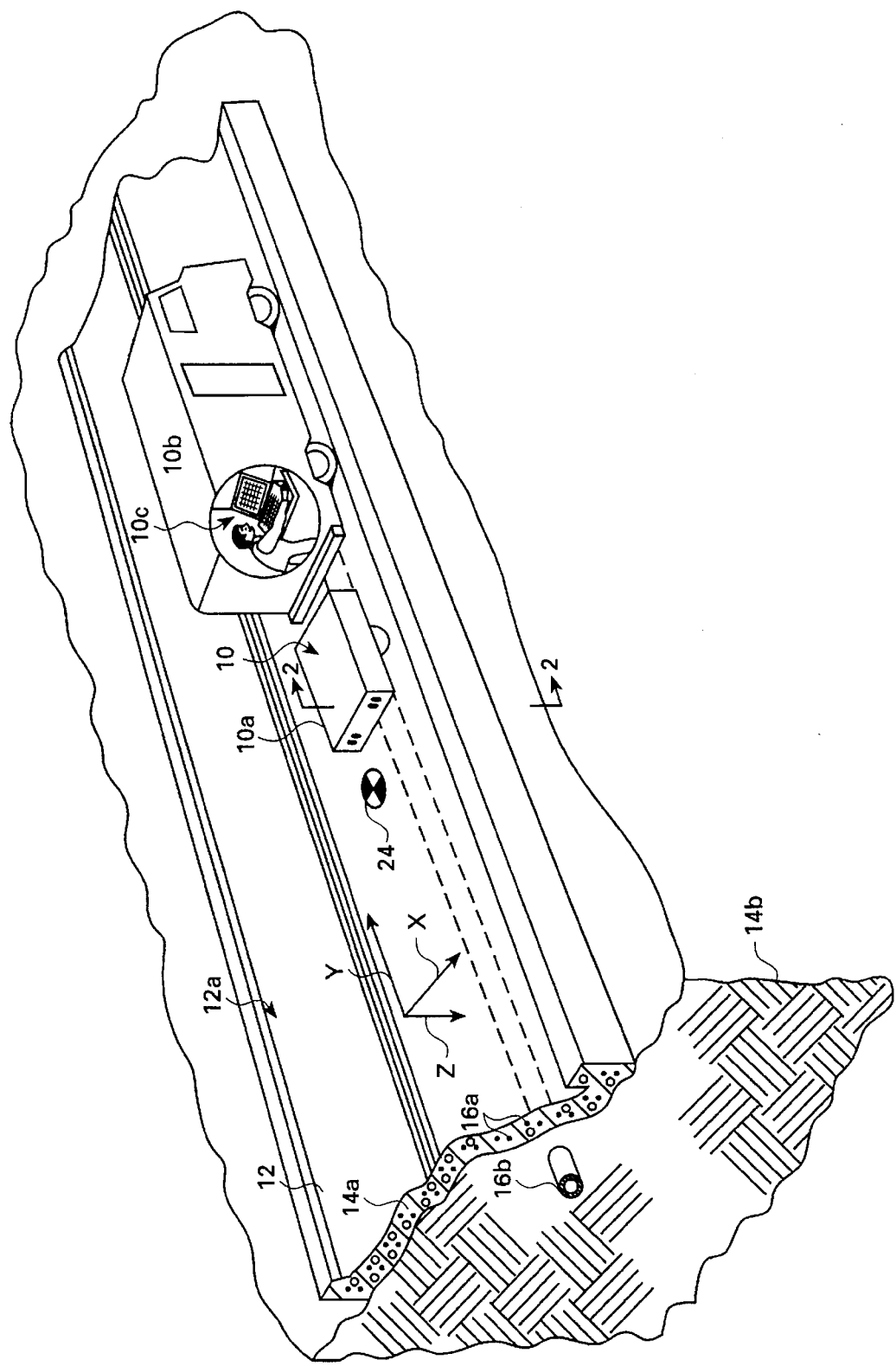
FIG. 1 is a schematic representation of a magnetic imager in accordance with one embodiment of the present invention for detecting concealed or buried objects.

Illustrated schematically in FIG. 1 is exemplary embodiment of a magnetic imager or scanner 10 which includes apparatus located in part in a trailer 10a and in part in a vehicle such as a van 10b which pulls the trailer 10a. The van 10b includes suitable data reduction equipment 10c including conventional programmable computers wherein measurements made by the equipment in the trailer 10a are analyzed and presented for examination by an operator who controls operation of the magnetic imager 10. The imager 10 may be used for practicing a new method of MAGnetic Imaging (MAGI) for detecting buried or concealed objects in various matrices. MAGI involves the measurement of magnetic fields close to the particular structure or subsurface zone under investigation when immersed in a low level applied background magnetic field for detecting the concealed objects therein. In the exemplary embodiment illustrated in FIG. 1, the MAGI trailer 10a is located on a typical roadway 12 which includes a surface 12a, such as asphalt, over a concrete matrix 14a which is reinforced by standard steel rebars 16a which define one form of concealed objects. The roadway 12 is formed on top of the underlying earth or ground 14b which forms another matrix in which one or more pipes 16b define other types of concealed objects therein.

FIG. 1 is presented to show exemplary concealed objects such as the rebars 16a and pipes 16b concealed in their typical matrices. However, the invention may also be applied to detect rebars inside other structures like bridge decks, dams, and buildings. And, the roadway 12 may simply have the asphalt surface 12a supported directly on the ground 14b or on a suitable gravel bed. In all embodiments however, MAGI may be utilized to detect the concealed objects such as the rebars 16a and pipes 16b which are typically metal and affect an applied background magnetic field.

Figure 2:
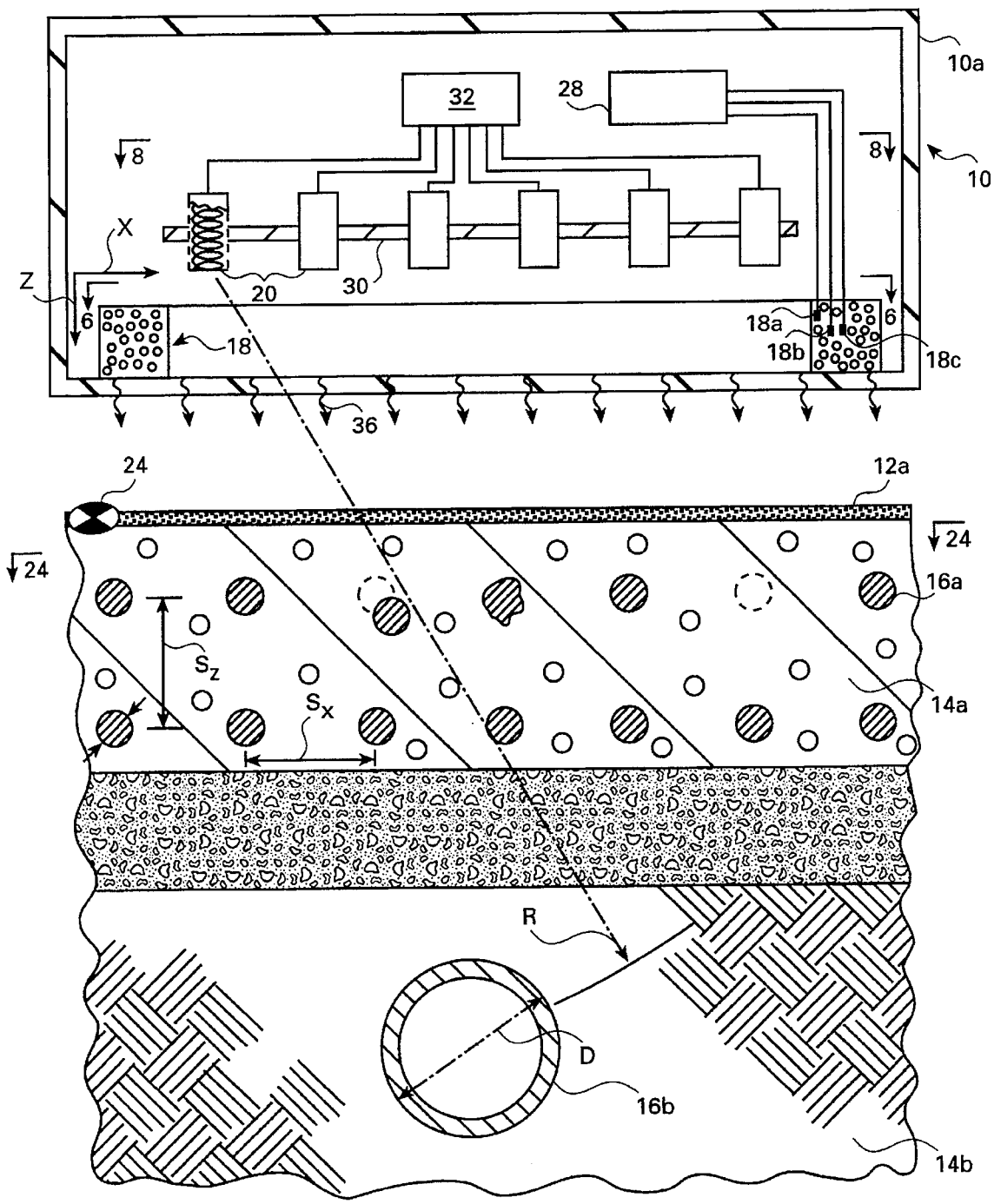
FIG. 2 is a schematic elevational, partly sectional view through a portion of the magnetic imager illustrated in FIG. 1 positioned over a roadway containing concealed rebars and pipes and taken generally along line 2—2.

FIG. 2 illustrates in more particularity an exemplary embodiment of the magnetic imager 10 mounted in part in the trailer 10a above the roadway surface 12a. The imager 10 includes means in the form of a generator 18 for generating or applying a preferably spatially uniform background magnetic field from outside the matrices 14a,b above the roadway surface 12a into the matrices 14a,b to immerse the concealed objects 16a,b therein, with the objects 16a,b being effective to locally perturb the applied background field around the objects 16a,b. FIG. 2 has been provided to show various types of exemplary concealed objects, such as the rebars 16a and one or more pipes 16b, in their suitable matrices. However, in practice, the invention may be applied to the simple cases of single rebars 16a or single pipes 16b without interference from adjacent objects. Or, as further described below, many concealed objects may be grouped together in a more complex case, with MAGI being used for discriminating the various objects either spatially laterally, or in depth, or both.

Figure 3:
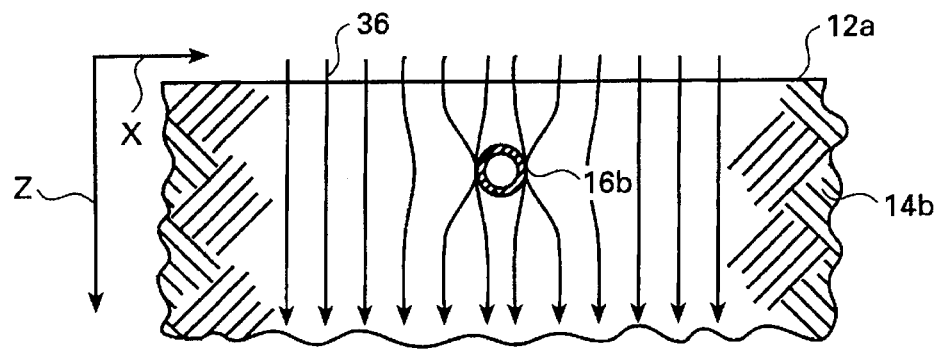
FIG. 3 is a schematic representation of an exemplary concealed object such as a pipe disposed underground in the presence of a substantially uniform applied magnetic field perturbed by the presence of the pipe itself.

FIG. 3 illustrates schematically the simple example of a single object such as the buried pipe 16b below the surface 12a in the earth matrix 14b, or a single rebar 16a in the concrete matrix 14a. A suitable coordinate system is introduced in FIG. 1 and carried through the various Figures and includes an X-axis which laterally traverses the roadway 12; a Y-axis which runs parallel with the roadway 12; and a Z-axis which runs downwardly through the roadway 12 and through the earth 14b for indicating depth of the concealed objects.

PERSUE TECHNIQUE

Figure 4:
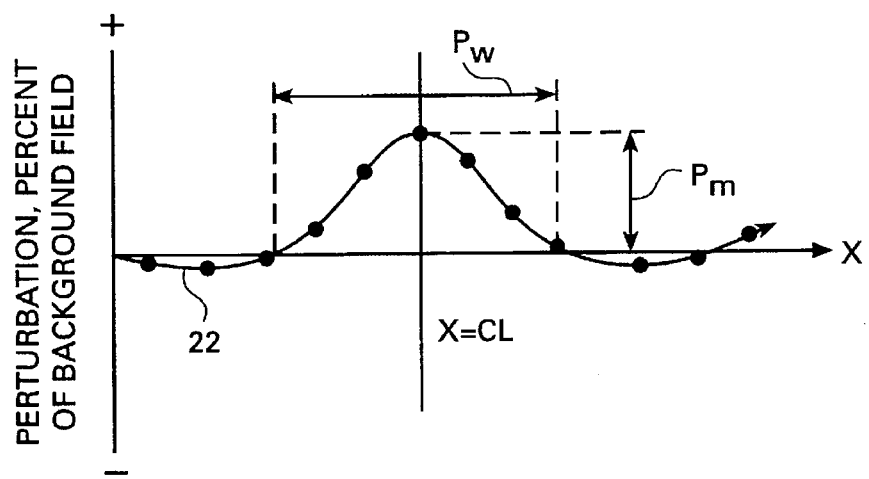
FIG. 4 is a graph plotting perturbation in percent of the applied background field versus lateral position for the pipe illustrated in FIG. 3.

FIG. 3 illustrates schematically that the substantially uniform applied background field is locally perturbed by the presence of the pipes 16b which may be iron or steel for example. One embodiment of MAGI is called the PERturbation of Static Uniform FiElds (PERSUE) technique. The presence of a localized iron or steel source for example in a quasi-static and spatially uniform background field will cause local perturbations due to concentration of the background magnetic flux into the source as illustrated schematically in FIG. 3. FIG. 4 illustrates graphically an exemplary embodiment of the perturbation spatial distribution expressed in percent of background magnetic field along the lateral or transverse axis X relative to the pipe 16b. Generally, for a single long cylindrical source like the pipe 16b, or a single rebar 16a, the magnetic flux is maximum at the surface at the cylinder, with a magnitude of about three times the background field. This perturbation can be detected at some distance from the object which may be used to detect the location of the object or pipe 16b both laterally along the X-axis and in depth along the Z-axis, as well as determining the size or diameter of the object.

In order to generate the perturbation graph illustrated in FIG. 4, the imager 10 illustrated in FIG. 2 includes suitable means in the exemplary form of one or more receivers or sensors 20 for measuring the perturbations of the background field to detect the object. By laterally measuring the perturbations along the transverse axis X, various distributed data points may be obtained to generate the exemplary perturbation profile 22 illustrated in FIG. 4. The magnitude of the perturbations may be measured by the sensor 20 spatially along a common plane including the horizontal X-axis line to locate the object 16b by depth in the Z direction, and by lateral or transverse position in the X direction. The measured profile 22 illustrated in FIG. 4 has a broad peak of maximum magnitude $P_m$ and a spatial width $P_w$ thereof which may be used for providing a reasonable first estimate of the location as well as the size of the pipe 16b. For a ferrous pipe 16b, the perturbation will be positive, or greater than the background field, directly above the centerline of the pipe 16b at X position equal to the centerline (CL). The perturbation will be negative, or less than the background field, in some regions around the source such as to both the left and right sides of the pipe 16b for forming negative or minimum valleys. It should be noted that the XYZ coordinate system may be used in any conventional fashion to correlate the measured profile 22 relative to a suitable reference point 24 in space as shown in FIGS. 1 and 2. By correlating the measured profile 22 relative to the reference point 24, the spatial location of the concealed pipe 16b may be specified in three dimensional space.

For the exemplary profile 22 illustrated in FIG. 4, a good estimate of the lateral, X position of the pipe 16b may be readily determined by the maximum positive peak and minimum negative valleys. Furthermore, the maximum peak magnitude $P_m$ and the peak width $P_w$ depend on the diameter D of the pipe 16b as shown in FIG. 2, and the radial distance R from the measuring point at the respective sensor 20. The ratio of the magnitude of the measured perturbation over the magnitude of the applied background field is generally proportional to the square of the ratio of the radius D/2 of the pipe 16b over the radial measuring distance R. For a detection discrimination capacity of $10^{-4}$. Or one part in 10,000 in the background field, the cylindrical source can be detected at a distance R that is on the order of 50 D. For a one-foot diameter pipe, this corresponds to a distance of approximately 50 feet, and for a 5/8 inch diameter rebar, the distance is about 3 feet.

For a single pipe or rebar source, a measurement at one point should be sufficient in principle to determine the lateral (X) and depth (Z) location of the source and its diameter using information on the magnitude and direction of the perturbed field. In practice, a set of distributed measurements as indicated by the measured profile 22 illustrated in FIG. 4 is desirable since it permits a better determination of the source geometry through conventional least-squares fit to the measured data points. Since the perturbations are magnetic field vectors, measuring the direction of those vectors in the vicinity of the source can also be used to more accurately determine the location of the source or object by depth below the sensor and lateral position relative to the sensor as described in more detail below.

One simple procedure for generating the measured profile 22 illustrated in FIG. 4 is to suitably laterally traverse the sensor 20 illustrated in FIG. 2 in the X direction and record various discrete data points. The locus of points may be used to generate the resultant profile 22. In this way, the perturbations may be measured spatially to detect the distribution of the perturbations due to the pipe 16b for detecting the location, as well as the size, of the pipe 16b. This procedure may also be used to detect one or more of the rebars 16a.

FIG. 4 is representative of detecting a single object such as one of the rebars 16a or a single pipe 16b. The generator 18 may be suitably sized and configured for inducing the background magnetic field in a local area for discriminating single concealed objects if desired.

In the exemplary embodiment illustrated in FIG. 2, the concrete matrix 14a would typically have two layers of crisscrossing rebars 16a, with the PERSUE technique being similarly applied for detecting the rebars 16a. For example, the generator 18 may be sized and configured for transmitting a substantially uniform background magnetic field across a suitable plurality of the rebars 16a preferably in one layer at a time, although the field may be applied to both layers. One or more of the sensors 20 may then be used for measuring the lateral distribution of the perturbations spatially across the plurality of rebars 16a for locating each of the rebars 16a.

Figure 5:
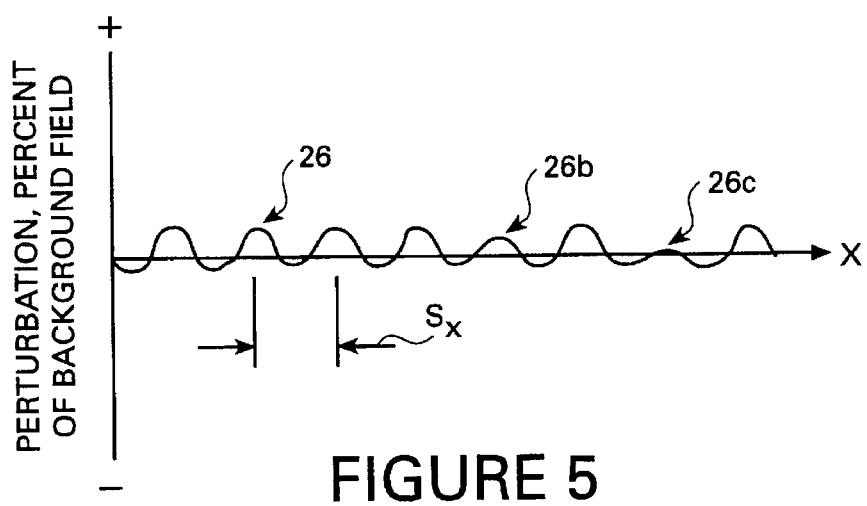
FIG. 5 is a graph plotting perturbation in percent of applied background field versus lateral position for the top layer of rebars illustrated in FIG. 2.

FIG. 5 is an exemplary graph plotting the magnitude of the measured perturbations as a percent of the background field along the X-axis with a distributed perturbation profile 26 including adjoining maximum peaks and minimum valleys like the single profile 22 illustrated in FIG. 4. As can be readily seen, each of the maximum peaks measured is indicative of the lateral X position of each of the rebars 16a. The lateral spacing $S_x$ between the adjacent maximum peaks is indicative of the actual lateral spacing of the rebars 16a in the concrete matrix 14a illustrated in FIG. 2. FIG. 2 illustrates that the third from the left rebar 16a in the top layer shown in solid line is mispositioned from its intended position shown in phantom. The fourth top rebar has a reduced diameter due to corrosion. And, the sixth top rebar is missing as represented by the phantom circle. In FIG. 5, the mispositioned rebar may be detected by its maximum magnitude and width and spacing $S_x$ which will be different than for the uniformly spaced apart pristine rebars. The partially corroded rebar has a reduced magnitude profile as indicated at 26b, and the missing rebar has a further reduced magnitude profile indicated at 26c.

With multiple source arrays of pipes or rebars, the two dimensional map of the perturbed field illustrated in FIG. 5 will of course be more complex than that for a single source such as that illustrated in FIG. 4. However, missing or strongly corroded rebars will depress the maximum peaks relative to the other peaks. And, the spacing between the peaks will give information about the rebar spacing for detecting out of position rebars or missing rebars in this simple example.

As indicated above, the rebars 16a may be arranged in a single layer below the surface 12a, with the distributed perturbation profile being suitably measured to detect the rebars 16a. Spatial discrimination of the several rebars 16a may be accomplished by spatial variation of the applied background field, or by spatial variation in measuring the perturbations to distinguish individual rebars 16a from the other rebars 16a. Spatial variation of the applied background field is desirable in order to more clearly distinguish what sources are contributing most strongly to the measured signal. The size and configuration of the generator 18 may be suitably altered to spatially vary the background field and its magnitude.

Figure 6:
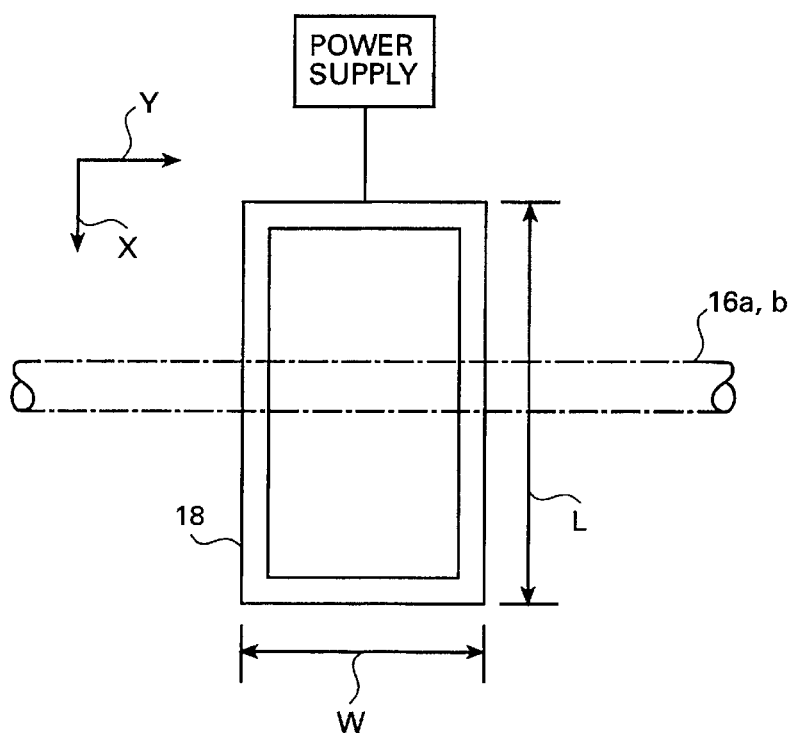
FIG. 6 is a schematic representation of one embodiment of the generator illustrated in FIG. 2 for applying a substantially uniform background magnetic field and taken along line 6—6.

For example, the exemplary generator 18 illustrated in FIG. 2 is in the form of a planar, rectangular excitation coil operatively joined to a power supply 28. The generator 18 is shown schematically in FIG. 6 relative to one of the rebars 16a or pipes 16b and has a length L preferably greater than a width W to immerse the concealed object 16a,b in a substantially uniform background magnetic field when positioned thereover. In one embodiment, the generator 18 has a plurality of independent coils 18a, 18b, and 18c illustrated schematically in FIG. 2 each independently joined to the power supply 28 for being selectively energized to control intensity of the applied background field for example. The generator 18 may therefore be sized and configured depending on the specific concealed object being explored to provide optimum discrimination thereof.

Figure 7:
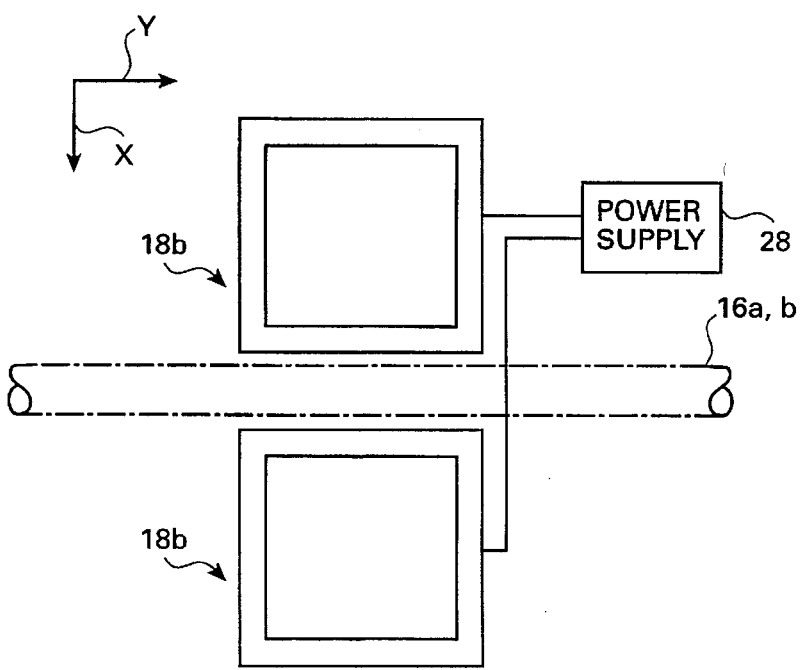
FIG. 7 is a schematic representation of an alternate embodiment of the generator illustrated in FIG. 6 showing two adjacent excitation coils for applying background magnetic fields.

FIG. 7 illustrates another embodiment of the generator designated 18B which is in the form of two laterally spaced apart excitation coils independently joined to the power supply 28 to increase discrimination of the lateral position of the object 16a,b. The two-coiled generator 18B provides substantially uniform applied background fields below each of the coils, with the lateral spacing between the coils not being subject to the background fields. The generator 18B may then be suitably laterally traversed relative to the concealed object 16a,b. Improved discrimination of the lateral location of the object 16a,b is obtained since a perturbation will be recorded when either of the two coils is positioned over the object, with a minimum or null reading when the object is positioned laterally between the two coils. Accordingly, translation of the applied laterally adjacent background fields may be used to further distinguish the concealed objects.

As indicated above, a single sensor 20 effective for measuring magnetic perturbations may be suitably translated over the surface 12a for detecting the concealed objects when passed adjacent thereto. As shown in FIG. 2, a plurality of the sensors 20 are preferred and are suitably fixedly mounted to a dielectric frame 30 inside the trailer 10a which has a preferably dielectric housing. In this way, supporting structures for both the generator 18 and the sensors 20 do not affect the transmission of the applied background field into the ground or the measurement of any resulting perturbations thereof. Each of the sensors 20 may take any suitable form including a pickup coil for detecting magnetic intensity. In the preferred embodiment illustrated in FIG. 2, a pair of the sensors 20 are electrically joined in series and in opposite polarity to provide a null or zero reading or measurement in the presence of the applied background field without the perturbations. The sensor pair may be calibrated relative to a specific magnitude of the applied background field to have a null reading so that the presence of any perturbations in the applied background field due to the concealed object 16a,b creates positive and negative readings indicative thereof.

Figure 8:
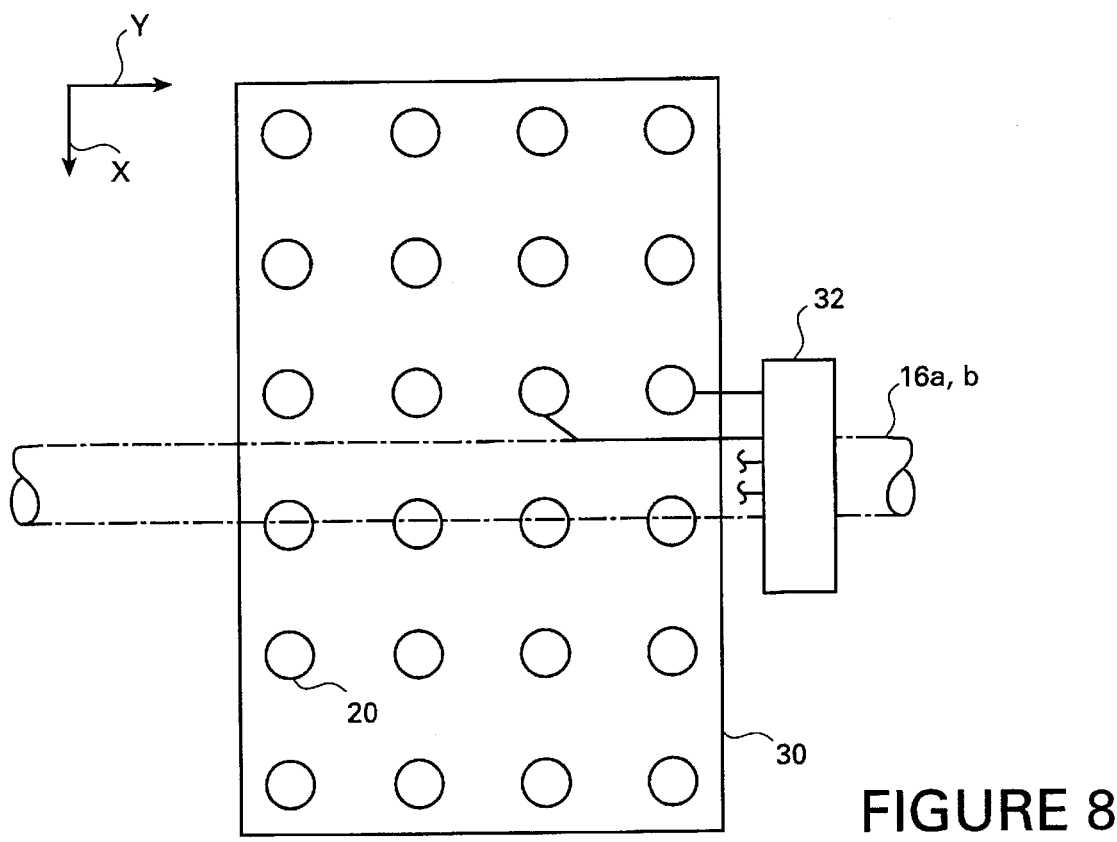
FIG. 8 is a schematic representation of the plurality of sensors illustrated in FIG. 2 for detecting perturbations in the applied magnetic field due to adjacent objects and taken along line 8—8.

FIGS. 2 and 8 illustrate schematically an exemplary arrangement of the plurality of sensors 20 arranged in a 2-D rectangular grid array of 4×6 sensors 20 for example. Each of the sensors 20 is operatively joined to a suitable common electrical controller 32. The controller 32 is configured for electrically joining together the sensors 20 in series pairs of opposite polarity to provide null readings in the presence of the background field without the perturbations. Any single one of the sensors 20 may be joined in series with any other one of the sensors 20 for defining a null sensor pair between them. In this way, the frame 30 may be temporarily held stationary at one location with different combinations of the sensors 20 being activated for measuring discrete data points. For example, the controller 32 is effective to sequentially form sensor pairs along a lateral line such as the X-axis for example to measure lateral distribution of the perturbations to detect the concealed objects 16a,b.

The controller 32 may also be effective to raster the sensor pairs in sequential lines. For example in FIG. 8, the left column of sensors 20 may be joined in sequential pairs from the top to the bottom followed in turn by the next right most column of sensors and in turn to the last column of sensors 20. In this way, measured profiles like 22 and 26 of FIGS. 4 and 5 may be generated at different longitudinal slices along the Y-axis. Or, the sensors 20 may be sequentially joined together in each row from left to right for example and then from row to row. In this way, a three dimensional distributed map may be generated over the given area of the sensors 20 and over the applied background field associated therewith.

Figure 9:
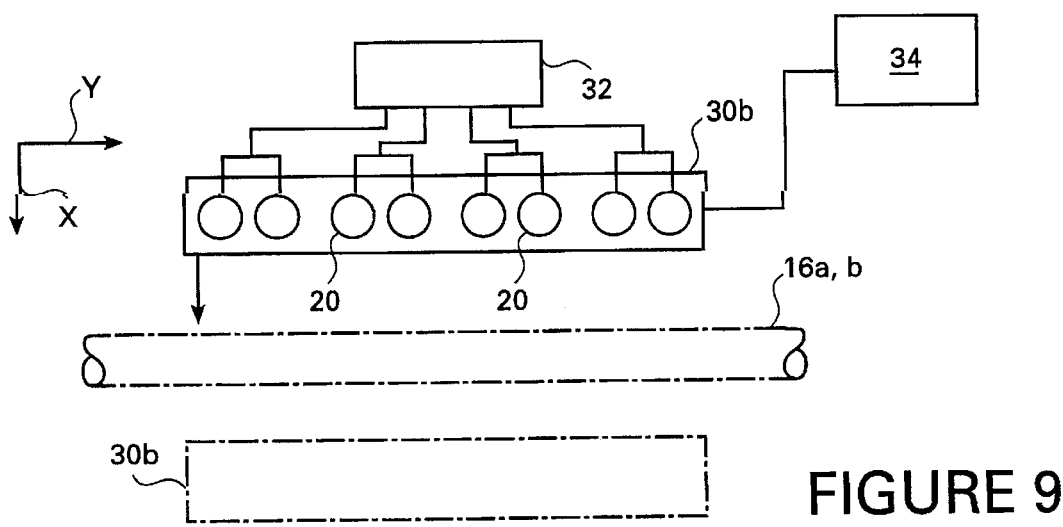
FIG. 9 is a schematic representation of an alternate embodiment of the sensors illustrated in FIG. 8 for detecting perturbations in the applied background field.

FIG. 9 illustrates another embodiment wherein the sensors 20 are arranged in pairs in a single sensor line array on a suitable frame 30b. Suitable conventional means 34 are provided for laterally translating the sensor array relative to the concealed object 16a,b in the X direction to provide a three dimensional measurement mapping substantially analogous to that provided by the FIG. 8 embodiment. The translating means 34 may include a suitably powered rack and pinion that translates the frame 30b relative to the trailer 10a.

The trailer 10a may remain stationary at a given location if desired while one or more sensors 20 are operated to develop distributed data points to create a map. Or, the trailer 10a itself may be translated either along the roadway in the Y direction as shown in FIG. 1 or laterally relative thereto in the X direction as desired for creating the distributed data map.

Figure 10:
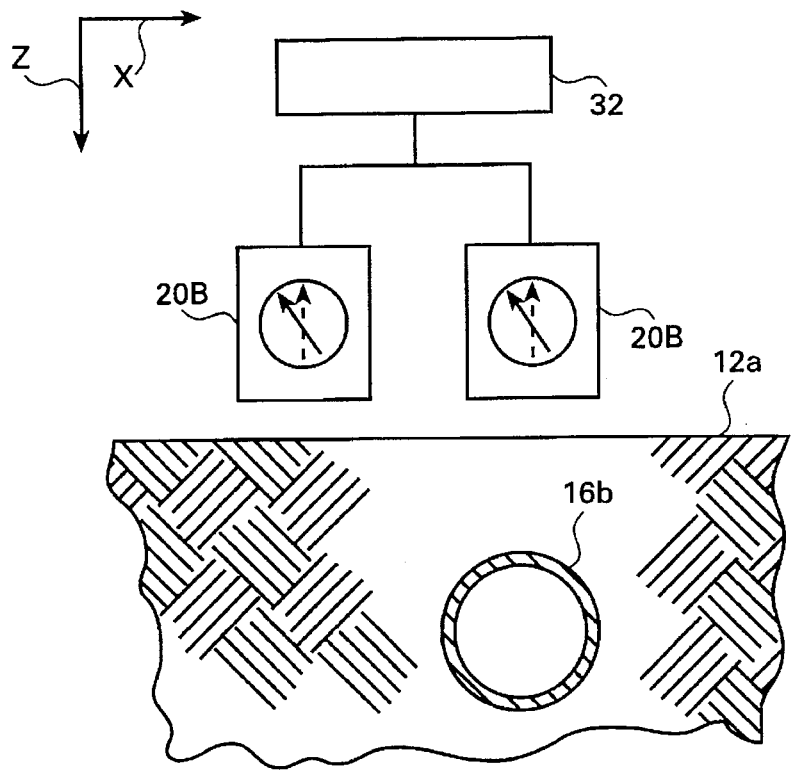
FIG. 10 is a schematic representation of yet another embodiment of sensors for measuring perturbations in the applied background field as well as direction of the vectors thereof.

Although the sensors 20 may be used as described above, the sensors may have an alternate embodiment designated 20B as illustrated in FIG. 10 in which they are conventionally configured, pivotable for example, for measuring both magnitude and vector direction of the perturbations for detecting the objects 16a,b. The sensors 20B are again preferably disposed in pairs of opposite polarity for providing a null reading in the presence of the applied background field without perturbations. As the sensors 20B are traversed adjacent to the concealed objects such as the pipe 16b, both the magnitude and direction of the perturbation vectors can be measured to improve location discrimination of the object 16b.

Figure 11:
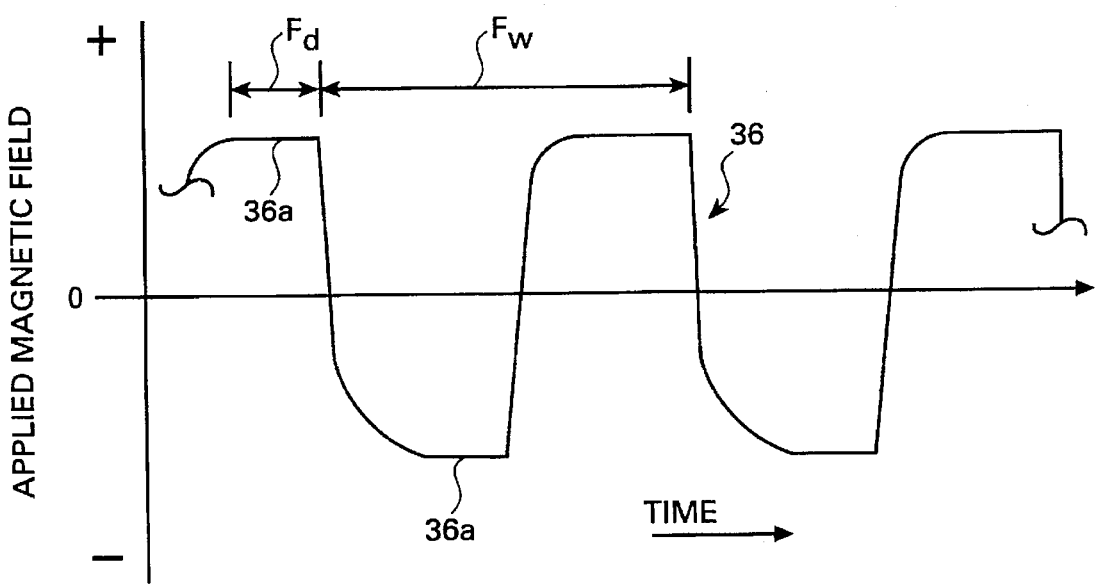
FIG. 11 is a graph of an exemplary periodically applied magnetic background field versus time.

In the preferred embodiment of the PERSUE technique, the background field is temporally varied or applied periodically or quasi-statically, with static intervals, with the perturbations being measured during the static intervals for improving detection capability. For ferrous objects, the applied background field may be constant if desired. A periodic, bipolar background field having alternating positive and negative magnetic polarity can improve detection of not only ferrous objects but also nonferrous objects which perturb the applied background field. FIG. 11 is a graph plotting magnitude of the applied magnetic field 36 versus time for an exemplary bipolar periodic field. The applied field is preferably a substantially square wave, or generally sinusoidal, field having substantially constant, static intervals 36a of alternating maximum positive and negative intensity for predetermined durations $F_d$. For example, the intensity of the applied field may have a magnitude of about 50 Gauss which is about 100 times the magnitude of the earth ambient magnetic field of 0.5 Gauss. Measurement of the perturbations is conducted only during the static intervals 36a in the PERSUE technique which measures perturbations in a static uniform field. In this way, transient eddy currents generated in the concealed objects 16a,b are minimized and do not adversely affect the measured static perturbations. As indicated above, spatial variation of the applied background field 36 may be additionally used to more clearly distinguish which of several concealed objects are contributing most strongly to the resultant measured signal. For example, where the objects such as the rebars 16a are substantially equally spaced apart laterally at the spacing $S_x$, the bipolar periodic background field 36 may be selected so that half of its wave length $F_w$ is substantially equal to the lateral spacing $S_x$ between the rebars 16a to help more clear distinguish between the rebar sources.

As indicated above, the rebars 16a illustrated in FIG. 2 may be arranged in a plurality of different layers. Accordingly, the applied bipolar periodic background field 36 illustrated in FIG. 11 may have several different wave lengths $F_w$ selected to more accurately distinguish between the different planes of the rebars 16a located at different depths below the surface 12a.

Different layers of the rebars 16a increase the difficulty of discriminating the various individual rebars 16a since the sensors 20 do not directly discriminate the measured perturbations in such different layers. As shown in FIG. 2, the top layer of the rebars 16a is disposed below the surface 12a, and the second or bottom layer of the rebars 16a is disposed deeper with a vertical spacing of $S_z$. In one embodiment, the top layer of the rebars 16a closest to the surface 12a is preferably measured first for the perturbations. The generator 18 and the sensors 20 may be specifically configured to maximize discrimination of the top layer and minimize effects from the bottom layer. The generator 18 and the sensors 20 may then be reconfigured as desired to maximize measurement of the perturbations of the bottom layer, with the top layer already being known.

Because the location and size of an individual rebar 16a or pipe 16b is not usually known, it may be useful to use an iterative convergence process to determine them. As indicated above, estimates of the location and size of individual objects may be adequate. However, as more and more objects in one or more layers create perturbations in the applied magnetic field, the difficulty of discriminating individual objects is increased.

Figure 12:
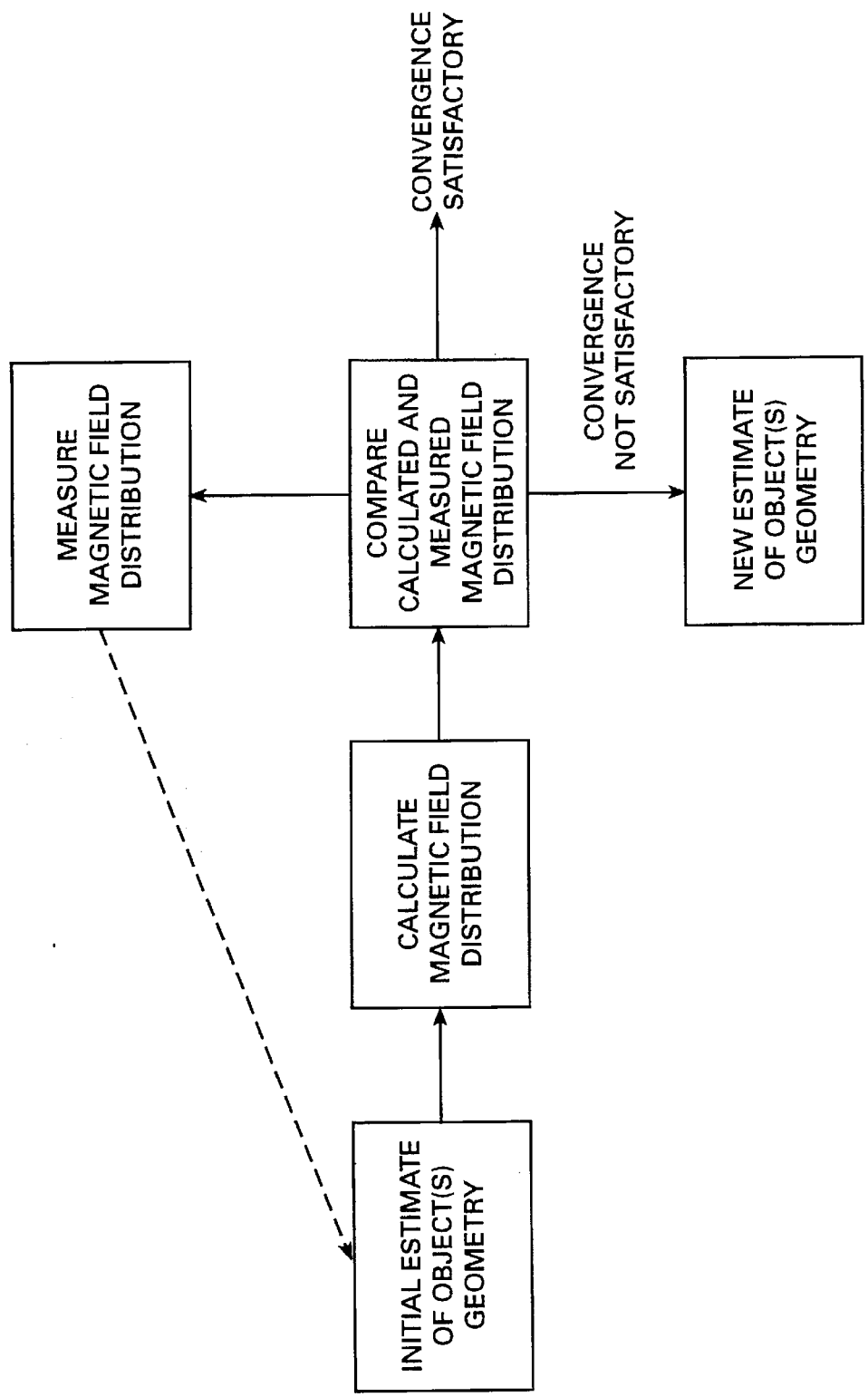
FIG. 12 is a flow chart representation of a method for iterating a comparison between calculated and measured magnetic field distributions to satisfy convergence therebetween.

Accordingly, a suitable iterative convergence process will typically be required for multi-layer concealed objects. FIG. 12 illustrates schematically the iterative process. Firstly, an initial estimate is made of the location geometry including depth, lateral position, and size of the concealed objects. As indicated above with respect to FIGS. 4 and 5 for example, the magnitude and spatial width of the measured perturbations should provide a very good first estimate of the source location and size.

The perturbation distribution may then be analytically calculated using conventional equations representing magnetic properties for the estimated objects for a given applied background field. Sophisticated 3-D magnetic computer codes have already been developed for high energy accelerator systems and may be conventionally used to advantage in calculating the magnetic field distribution for the initial estimate of the concealed objects. The measured distribution is then compared to the calculated distribution to determine if the difference therebetween is suitably low to satisfy a suitable convergence criteria. If not, a new estimate of the geometry of the objects is made by any suitable technique including extrapolation or interpolation from the previous estimates of the geometry, and the magnetic field perturbation distribution is then calculated again. By iterating the estimated geometry, calculated field, and comparing steps, convergence to a satisfactory criteria between the calculated and measured distributions may be reached when they are suitably equal to each other.

The magnitude $P_m$ and spatial width $P_w$ of the measured perturbations in FIGS. 4 and 5 may be used for the initial estimate, as well as the different polarities and values above and laterally from the objects 16a,b. By first determining the geometry of the top layer of the rebars 16a illustrated in FIGS. 2 and 5, the effect thereof on the perturbation field then becomes a known value. The bottom layer of the rebars 16a may then be similarly analyzed to predict their geometry. Of course, the existence of rebars in a structure is typically known from the beginning since standard diameter rebars and standard spacings are typically known. The iteration technique may therefore be used to discriminate each of the individual rebars in the various layers, but of course is a more complex mathematical and procedural effort. Iterating the first layer to convergence prior to examination and iteration of another layer is desirable to reduce the difficulty of the process.

Since the PERSUE technique described above is effective to not only locate the concealed object, but also determine its size, then a change in the size may be used for detecting corrosion or degradation of the object. As indicated above, the height and width of the maximum peak in the profile 22 illustrated in FIG. 4 depends upon the diameter of the object and its radial distance below the surface from the sensor 20. The various magnetic mapping profiles illustrated in FIGS. 4 and 5 are 2-dimensional in nature for detecting the geometry of the objects in a given reference X-Z plane. The maps may be repeated at different planes along the third, Y-axis (see FIG. 1). If the Y-axis is aligned with the longitudinal axis of the object such as a pipe or long rebar, the profiles of FIGS. 4 and 5 should remain constant in that Y direction. Any of the several transverse X-Z planes may be used to provide a reference size for the objects being detected for determining any reduction in size thereof at other X-Z planes relative thereto. Alternatively, the reference size may be a given size since the size of the rebar 16a or the pipe 16b being investigated is usually known. The given size may be used as a reference to compare any degradation thereof. A steel rebar, for example, will effectively become smaller in diameter as it corrodes. A relatively small amount of corrosion, e.g. $1/16$ of an inch, will produce a relatively large change in size. A $5/8$ inch diameter rebar will shrink by 20% in radius in such an example. Such a change can be easily detected by the PERSUE technique. Changes in the diameter of large pipes resulting from corrosion will be more difficult to detect since small loss of pipe wall thickness changes the overall diameter of the pipe relatively little.

The PERSUE technique has many advantages for the detection of concealed objects based on the perturbation of an applied static uniform field. It, however, will be inherently limited in detection capability by the ability of the field measuring devices to discriminate small fractional changes in the applied field at substantial distances from the perturbating object or source.

DELVE TECHNIQUE

Figure 13:
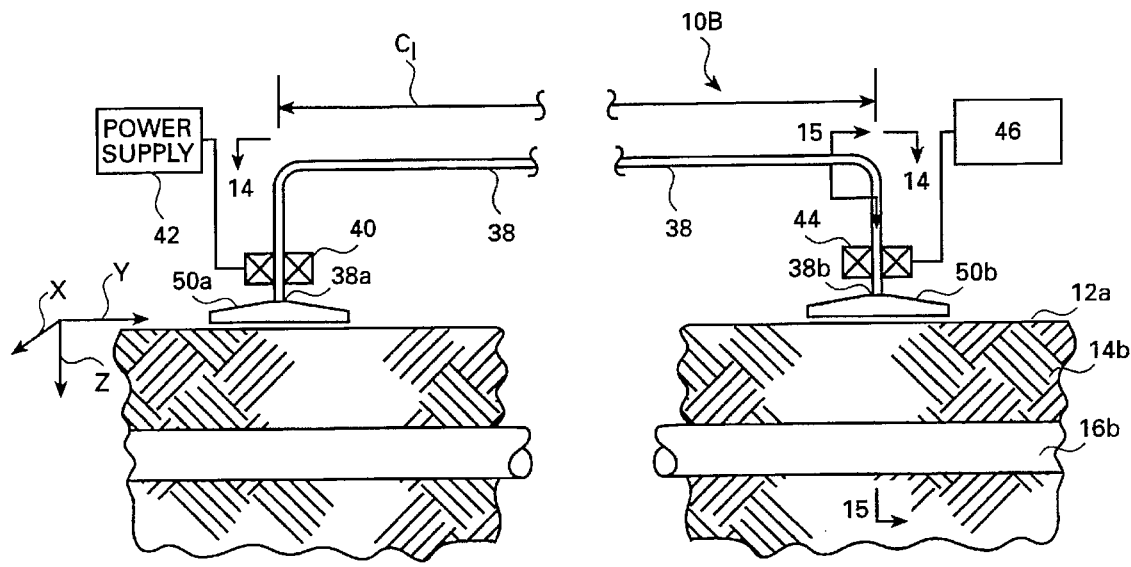
FIG. 13 is a schematic representation of an alternate embodiment of the present invention having a generator and sensor at opposite ends of a cable for being magnetically coupled to a concealed elongate pipe for mapping the location thereof.

MAGI includes another much more sensitive technique termed DEtection of Low Value for Magnetic Reluctance Path (DELVE) which has the potential to determine the location and size of long iron or steel sources such as rebars, pipes, pilings, etc. with much greater signal strength and at considerably greater distance than PERSUE. In the exemplary embodiment illustrated in FIGS. 13–15, a DELVE magnetic imager designated 10B is suitably positioned above ground surface 12a for detecting an elongate object such as the pipe 16b concealed in the earth matrix 14b. The imager 10B includes an elongate electrically conductive cable 38 having first and second opposite ends 38a and 38b. The cable 38 is preferably flexible and comprises a plurality of laminated or electrically insulated strands 38c as shown in cross section in FIG. 15. A generator 40 in the form of a coil is disposed at the cable first end 38a for inducing a magnetic field downwardly into the ground 14b. A suitable power supply 42 preferably powers the generator 40 with a suitable square wave DC current.

A sensor 44 in the form of a coil is disposed at the cable second end 38b for measuring intensity of the magnetic field induced by the generator 40. A suitable electrically controller 46 is operatively joined to the sensor 44 for providing visual or audial information indicative of the measured magnetic field.

During operation, the generator 40 at the cable first end 38a may be intentionally positioned over a known location of one part of the buried pipe 16b. The generator 40 is energized to induce a magnetic field which extends along the length $C_1$ of the cable 38 as defined laterally between the generator 40 and the sensor 44. By manually moving the remaining portion of the cable 38 and thereby the magnetic field carried therein above the ground 14b the cable 38 can be aligned longitudinally with the buried pipe 16b. Prior to alignment, the signal sensed in the sensor 44 will be very weak since it is at a considerable distance from the generator 40, for example tens to hundreds of feet therefrom. However, upon longitudinal alignment of the cable 38 over the pipe 16b a low reluctance magnetic circuit will be effected with the pipe 16b which will substantially increase the signal detected by the sensor 44. The signal will be enhanced by a factor generally proportional to the ratio of the length of the cable $C_1$ over the depth (Z) of the pipe 16b below the sensor 44. The signal enhancement factor will be substantially greater than 1 in view of the relatively long length of the cable 38. If the location of any portion of the pipe 16b is not known, both ends of the cable 38 would have to be moved until both ends are disposed over the pipe 16b with the cable 38 being longitudinally aligned therewith for creating the low reluctance magnetic circuit.

Once the location of one part of the buried pipe 16b is determined, the process may be repeated sequentially with the generator 40 being positioned over the pipe 16b and the remaining portion of the cable 38 being moved until aligned with additional lengths of the pipe 16b for recreating the low reluctance magnetic circuit and therefore mapping the path of the pipe 16b sequentially.

Figure 15:
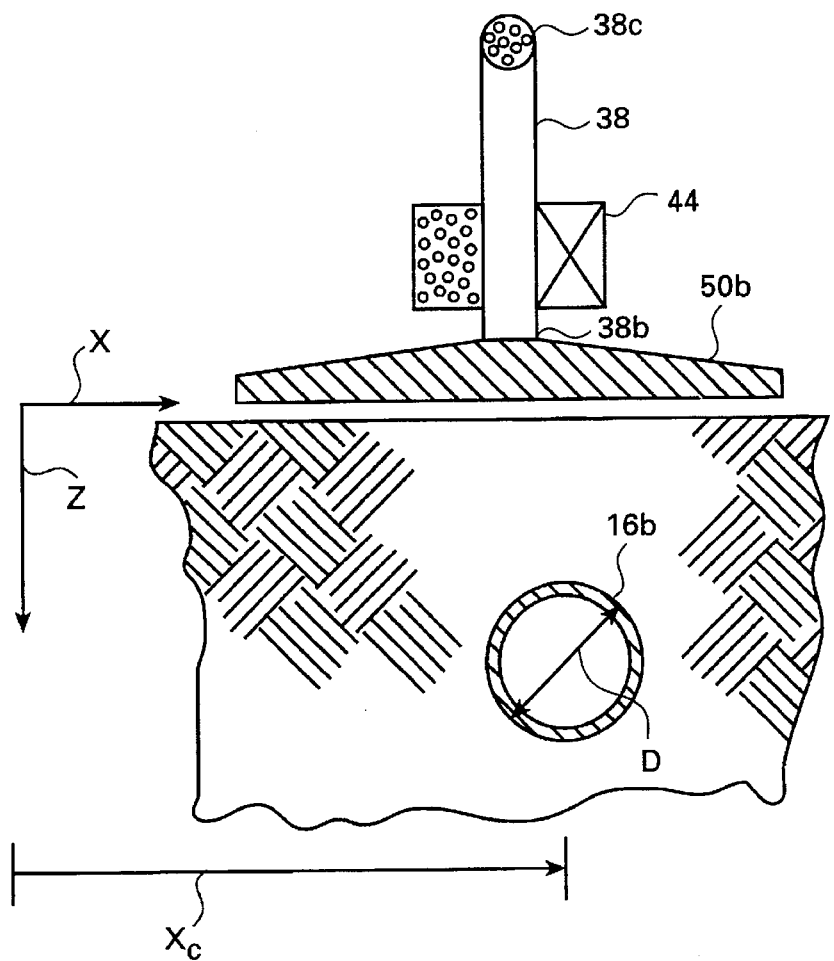
FIG. 15 is a partly sectional view through the cable and sensor illustrated in FIG. 13 and taken along line 15—15.
Figure 16:
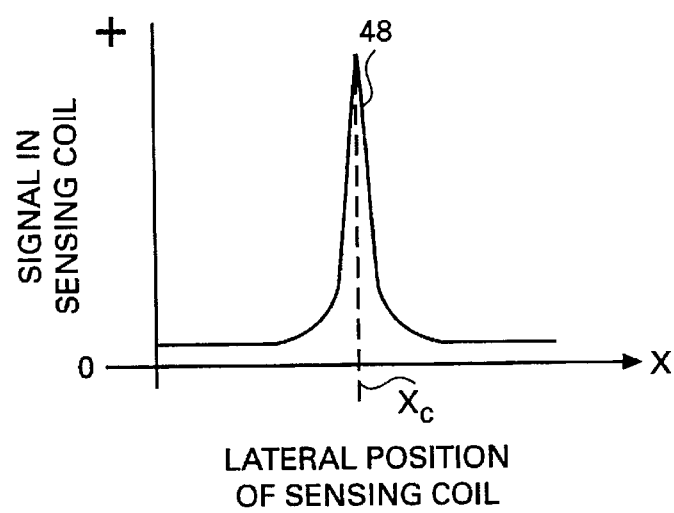
FIG. 16 is an exemplary graph plotting signal intensity of the sensing coil illustrated in FIG. 15 versus lateral position over the underground pipe.

FIG. 16 is a graph plotting the signal in the sensing coil 44 along the lateral X-axis. When the sensor 44 is directly aligned above the buried pipe 16b as illustrated in FIG. 15, a maximum, peaked signal 48 will be detected by the sensor 44. The maximum peak corresponds with the lateral position $X_c$ of the center of the pipe 16b in a suitable reference coordinate system. The height or magnitude, and width of the signal defining the peak depends upon the diameter D of the pipe 16b, its depth in the Z direction below the sensor 44, and on the length $C_1$ of the cable 38. Standard magnetic equations or computer codes may therefore be used to determine the depth and diameter of the buried pipe 16b from these parameters.

In order to improve magnetic coupling between the pipe 16b and the generator 40 and sensor 44, a pair of respective ferro-magnetic disks or poll faces 50a and 50b are electrically joined to the cable first and second ends 38a, 38b, respectively, and adjacent to the respective generator 40 and sensor 44.

Figure 14:
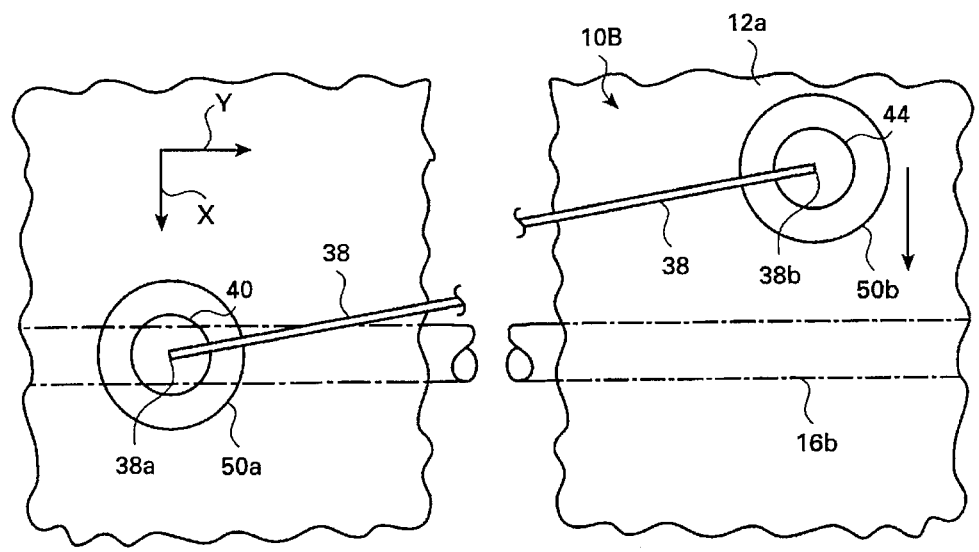
FIG. 14 is a top view of the embodiment illustrated in FIG. 13 and taken along line 14—14.

As shown in FIG. 14, as the sensor 44 is moved toward the buried pipe 16b the measured signal will increase in value as the maximum peak shown in FIG. 16 is approached, indicating the direction toward the buried pipe 16b. If the sensor 44 is moving away from the buried pipe 16b the signal will correspondingly decrease.

Figure 17:
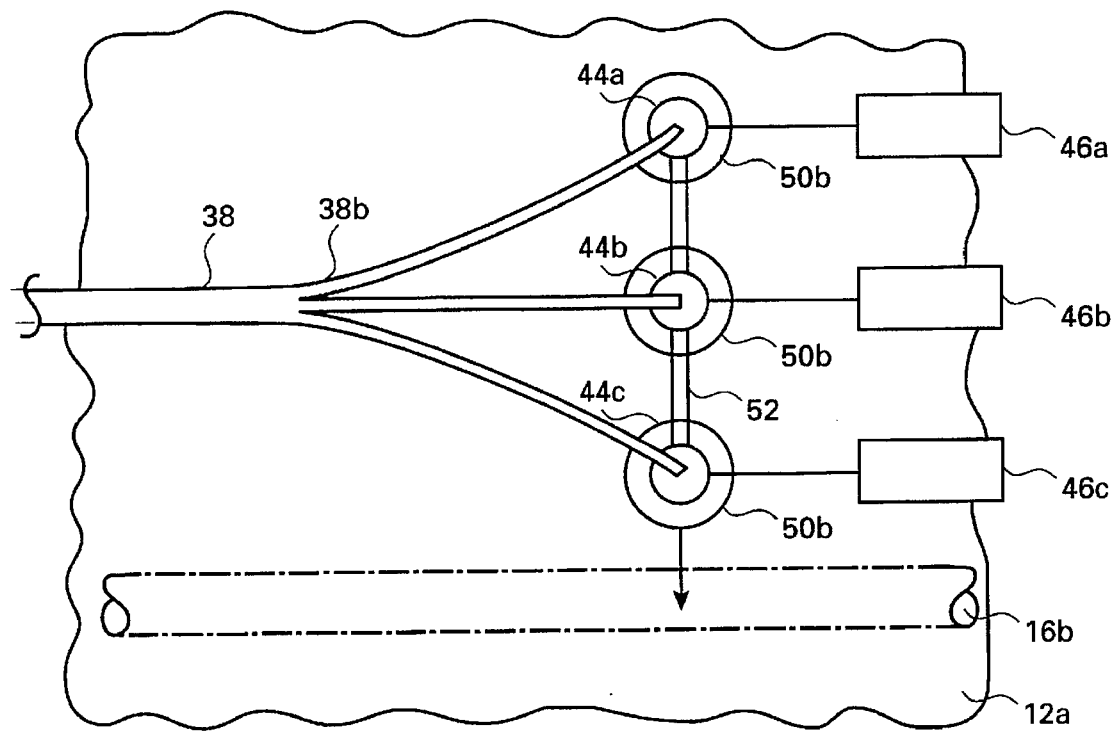
FIG. 17 is an alternate embodiment of the sensor illustrated in FIGS. 13 and 14 including a plurality of aligned sensors.

FIG. 17 illustrates another embodiment including a plurality of the sensors 44a, 44b, and 44c each having its own controller 46a, 46b, and 46c. The sensors 44a–c are preferably arranged on a suitable frame 52 in a line transverse or perpendicular to the cable 38 at its second end 38b for independently measuring intensity of the magnetic field. The cable second end 38b is split into a corresponding number of lines to pass through respective ones of the sensors 44a–c, and in turn is joined to suitable ones of the disks 50b. Since the sensors are arranged on the frame 52 perpendicular to the cable 38, they will necessarily record different readings. The different readings may be used to indicate the lateral direction of the buried pipe 16b since the signals will be greatest in the sensor closest to the pipe 16b and least in the sensor furthest away therefrom. The sensors 44a–c may be calibrated to indicate the lateral distance needed to travel to reach the buried pipe 16b.

The DELVE technique may readily discriminate between different pipes under the same roadway or different rebars in the same overall structure since it can establish the low reluctance magnetic path only with a given pipe or rebar targeted by the generator 40. The DELVE technique may also be used to readily follow a branching pipe system to find out which pipes were connected, since welded or threaded joints continue the low reluctance magnetic path.

The DELVE technique however will not be particularly useful in detecting local corrosion or other degradation in a quasi-static mode of operation. Local variation in the amount of iron or steel does not appreciably change the magnetic reluctance of the long circuit unless it involves a major reduction in the amount of iron or steel over a relatively long portion of the pipe or rebar. However, both the DELVE and PERSUE techniques may be combined with the following transient field technique for detecting local corrosion and degradation of the rebars or pipes.

TEMPER TECHNIQUE

The PERSUE and DELVE techniques described above use quasi-static applied background fields to detect and characterize concealed objects. The applied background field may be temporally varied to aid in signal discrimination if desired, but the rate of change is relatively slow so that the signals from magnetic fields caused by transient eddy currents do not affect either the measurement of the perturbations or signal intensity.

Transient Eddy Magnetic Perturbation (TEMPER) is a technique wherein the applied background magnetic field is suddenly created, altered, or removed so that transient eddy currents are induced in the concealed objects such as iron or steel rebars or pipes. In one example, the applied background field is initially induced and immerses the object such as the pipe 16b therein as illustrated in FIG. 3. In the PERSUE technique described above, the local perturbations of the magnetic field while the applied background field is maintained at a steady state or static level are measured. However, if the applied background field is interrupted or suddenly cut off, it essentially disappears leaving the earth ambient background field which is substantially less. As indicated above, the applied background field may have an intensity of about 50 Gauss whereas the earth ambient field has a value of about 0.5 Gauss.

Figure 18:
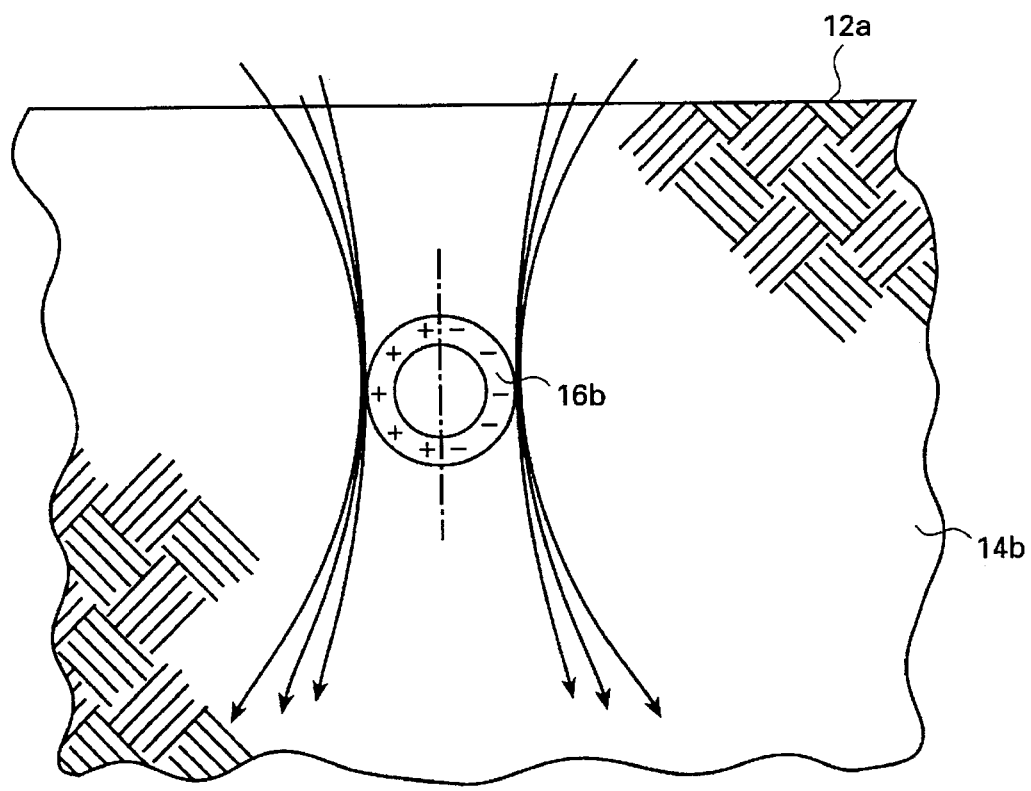
FIG. 18 is a schematic representation of eddy current induced perturbations around a buried pipe after interruption of a uniform applied background magnetic field.

In the short interval following interruption of the applied background field, transient or temporary eddy currents will be created in the pipe 16b as illustrated schematically in FIG. 18. The eddy currents flow longitudinally down one half of the pipe or rebar as indicated by the minus signs therein, and return along the other half as indicated by the plus signs. The magnitude and spatial distribution of the eddy currents is such that the original perturbed field associated with the presence of the pipe or rebar is maintained for a relatively short time after cut off of the original static background field. The disappearance of the background field considerably improves the discrimination capability since the detected perturbation is now measured relative to the low intensity earth ambient field instead of the higher intensity applied field. With a discrimination capability of one part in 10,000, the PERSUE technique described above may detect the presence of the source out to a distance of approximately 100 times the radius of the object. By removing the applied background field, the TEMPER technique may then detect the source out to a considerably greater distance, on the order of about 1,000 times the radius of the object since the earth ambient field now provides a new, much smaller magnitude background.

Accordingly, the TEMPER technique may be practiced in a manner similar to that for the PERSUE technique for measuring the perturbations due to the transient eddy currents upon cut off of the applied background field, whereas the PERSUE technique measures the perturbations relative to the applied background field with eddy currents being insignificant.

Figure 19:
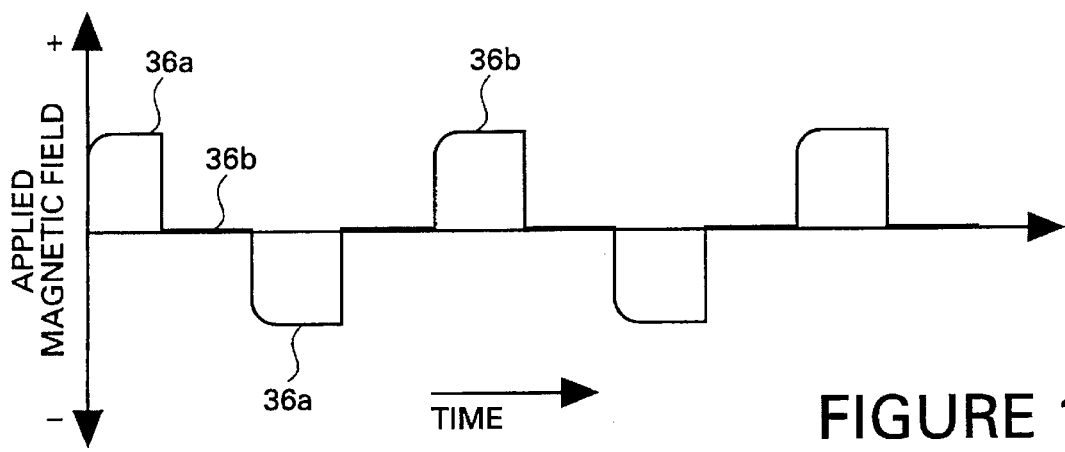
FIG. 19 is a graph of an exemplary periodically applied magnetic field versus time having bipolar maximum and minimum intensity with an interruption interval therebetween in each cycle.

FIG. 19 is a graph plotting the intensity of the applied magnetic field versus time to show a preferred form of the applied field designated 36B which is applied periodically to induce temporary eddy currents in the concealed pipes 16b or rebars 16a for effecting temporal variations of the perturbations, with the temporal variations of the perturbations being measured to detect the pipe 16b or rebar 16a. The applied field 36B illustrated in FIG. 19 is generally similar to the applied bipolar substantially square wave field 36 illustrated in FIG. 11 except however, the applied field 36B includes periodic cut off interruptions of zero magnitude as shown at 36b in each of the applied cycles. During the periodic interruptions 36b of the applied background field, the temporal variations of the perturbations may be measured to increase discrimination of the perturbations relative to the non-interrupted background field as indicated above. The maximum applied field is effected periodically during the positive and negative static intervals 36a, with the corresponding perturbations thereof being effected due to the presence of the concealed object. Interrupting the applied background field in the immediately following interval 36b increases the intensity of the measured perturbation due to the transient eddy currents since the applied background field has been temporarily removed. In the PERSUE technique the perturbations are measured during the maximum intensity intervals 36a, whereas in the TEMPER technique the perturbations are measured immediately thereafter in the interrupted interval 36b.

The TEMPER technique may also be used to measure the magnitude and directions of the perturbation vectors produced by the eddy currents during the interrupted intervals 36b to provide information on the location such as depth in the Z direction and lateral position in the X direction of the object, as well as the size thereof.

A significant advantage of the TEMPER technique is the ability to measure a rate of change or a rate of decay of the eddy current induced perturbations for detecting the local condition of the object such as degree of corrosion, cracking, or weld status for example. The rate of decay of the measured perturbation signal depends on the effective electrical resistance of the conductive object such as an iron or steel rebar or pipe.

Figure 20:
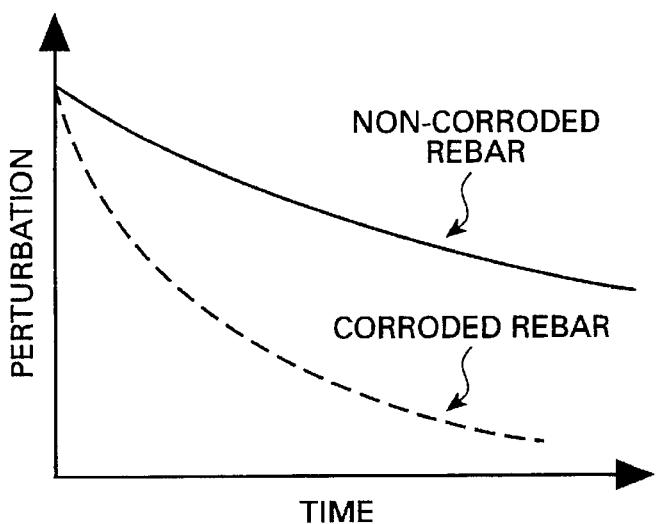
FIG. 20 is a graph plotting perturbation intensity versus time for corroded and non-corroded rebars.

FIG. 20 is a representative graph plotting the magnitude of the measured perturbation versus time with one decay curve for a non-corroded rebar shown in solid line and another decay curve for a corroded rebar shown in dashed line. The corroded rebar has a faster rate of decay compared to the reference rate of decay of the non-corroded rebar.

Figure 21:
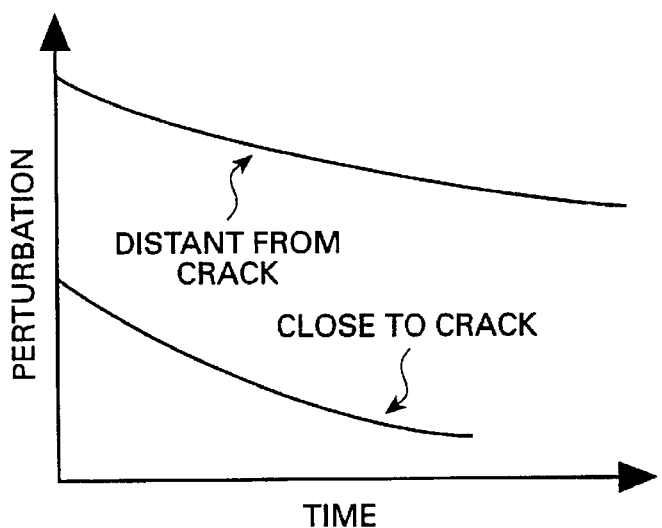
FIG. 21 is a graph plotting perturbation intensity versus time for rebar portions located close to and distant from a crack.

FIG. 21 is a graph similar to FIG. 20 showing the rate of decay of the measured perturbation close to a crack in the rebar which has a decreased magnitude and is faster than the rate of decay at locations distant from the crack.

Figure 22:
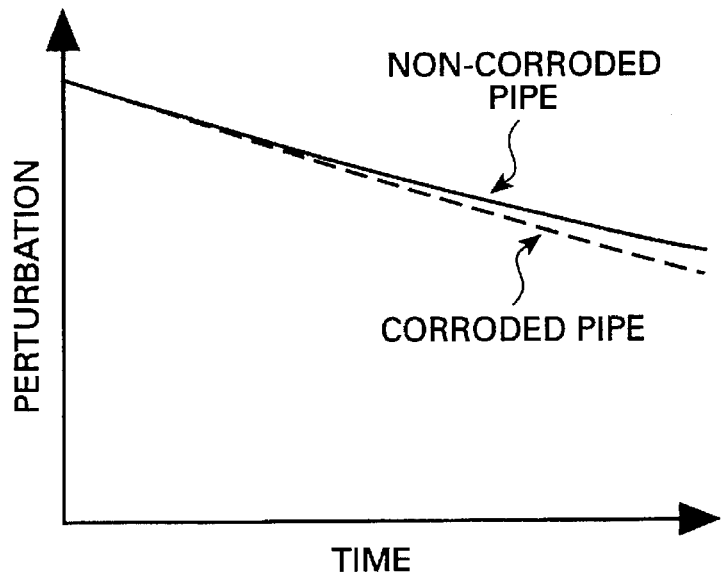
FIG. 22 is a graph plotting perturbation intensity versus time for corroded and non-corroded pipes.

FIG. 22 is another graph plotting perturbation intensity versus time for indicating the different rates of decay for corroded and non-corroded pipes with the former being slightly faster than the latter.

Figure 23:
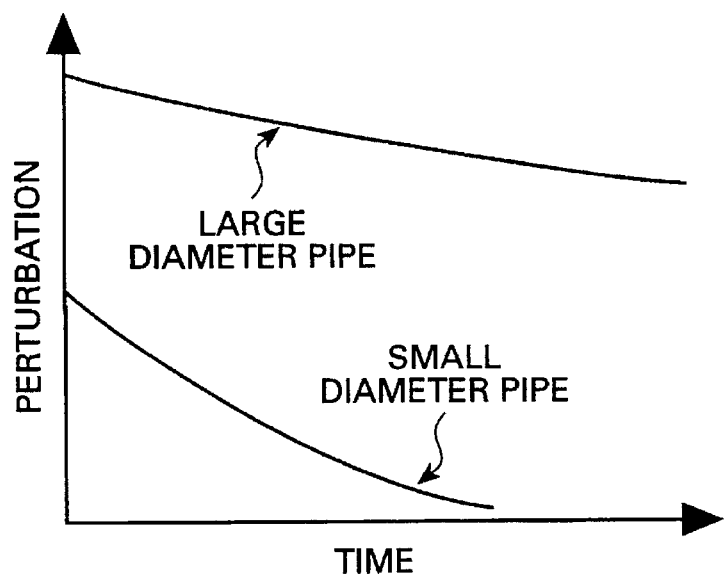
FIG. 23 is a graph plotting perturbation intensity versus time for small and large diameter pipes.

FIG. 23 is another graph of perturbation intensity versus time indicating the smaller magnitude and faster rate of decay for a smaller diameter pipe relative to a larger diameter pipe.

Figure 24:
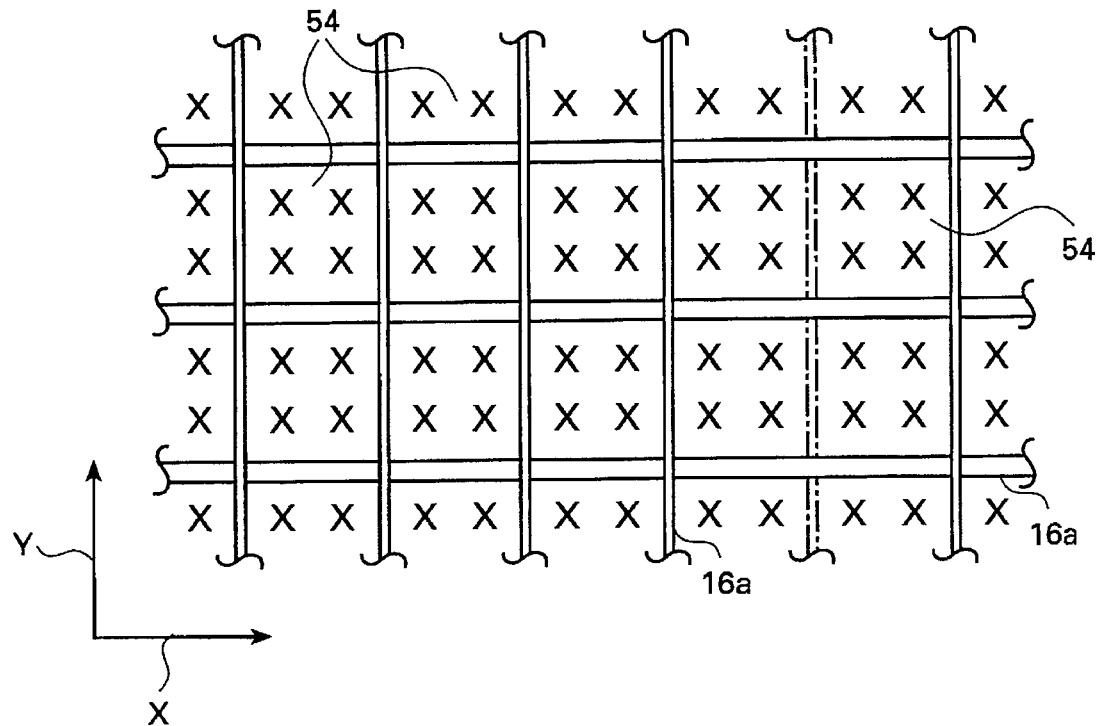
FIG. 24 is a schematic representation of a top view of the upper rebar layer illustrated in FIG. 2 and taken along line 24—24 showing the applied background magnetic field at maximum value.

FIG. 24 is a schematic representation of a top view of a portion of intersecting rebars 16a in the top layer illustrated in FIG. 2. This view schematically indicates the status of the applied background field at its maximum value in the interval 36a illustrated in FIG. 19 just prior to the interruption thereof. The intersecting rebars 16a form a square grid work of many cells 54. The X's in the cells indicate the uniform presence of the applied background field schematically.

Figure 25:
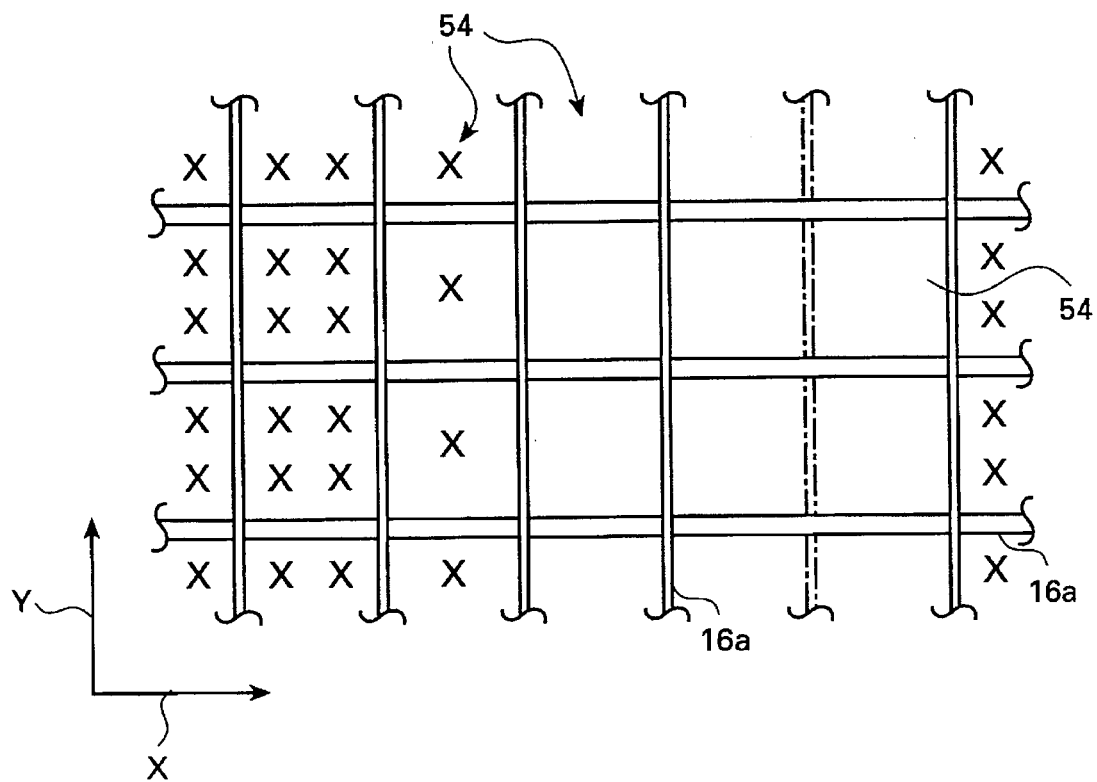
FIG. 25 is identical to FIG. 24 except showing schematically various rates of decay of the measured perturbations.

FIG. 25 is identical to FIG. 24 except occurs at a certain time in the interruption interval 36b illustrated in FIG. 19 soon following the cut off of the maximum applied background field interval 36a. Any of the bounding rebars 16a defining the various cells 54 which have greater electrical resistance than a normal or nominal value due to corrosion, cracking, poor welds, missing rebars, etc. will have a faster rate of decay than the cells 54 bounded by non-degraded rebars 16a. The X's are provided in the non-degraded rebar cells 54, and are removed from degraded cells to indicate the faster rate of decay and the likelihood of corrosion or some other anomaly. FIG. 25 illustrates in phantom a missing rebar at the fifth vertical position, with the cells 54 adjacent thereto having a greater rate of decay and therefore the X's have been removed. The bottom horizontal rebar has a crack or interruption between the third and fourth vertical rebars which will cause an increased rate of decay and therefore the X's have been removed. The top horizontal rebar at the fourth vertical rebar experiences a poor weld thereat which also results in a faster rate of decay and the X's have been removed. And, the third vertical rebar has undergone considerable corrosion which increases its rate of decay with some of the X's being removed to indicate an intermediate rate of decay. Of course, FIG. 25 is provided schematically with many types of possible anomalies being indicated to show the faster rate of decay. In practice, it is expected that such anomalies would be far and few between with their detection being more apparent over the non-degraded rebar cells.

As in the single pipe or rebar examples presented above, the actual value of the rate of decay in the rebar cells 54 will depend on the degree of corrosion, cracking, or weld degradation. The decay rate will also be affected by the position of the cell in the grid. In general, interior cells will show a slower rate of decay than cells on the boundary of a grid if one of the bounding rebars is degraded since other rebars can carry a portion of the induced eddy currents. The time scale for current decay will depend on the particular situation including the source geometry and size and degree of degradation for example, but typically will be in the range of a few milliseconds to a few tens of milliseconds.

The various MAGI concepts disclosed above have substantial advantages for a wide range of infrastructure applications. MAGI may be used to determine the location, integrity, and expected lifetime of structural reinforcement. It may be used for mapping of underground piping systems and detection of local corrosion. It may be used to determine structural integrity of girders and pilings. MAGI can be used to map both single and multiple iron, steel, or other metallic objects concealed in a matrix. It may be used to accurately locate the position and size of the various objects in three dimensions as well as determining their integrity. MAGI also has the capability to detect relatively small objects that are positioned at considerable distances under the surface of the structure or the ground.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A method for detecting a plurality of objects (16a,b) that are spaced apart laterally, the objects being concealed in a matrix (14a,b) comprising:

applying a bipolar background magnetic field from outside said matrix above a surface thereof across said plurality of objects to immerse said objects therein, said field being applied periodically with static intervals, with each of said objects being effective to locally perturb said applied background field said bipolar background field has a half wavelength substantially equal to the lateral spacing between said objects; and measuring said perturbations of said background field spatially across said plurality of objects during said static intervals to detect distribution of said perturbations for detecting and locating each of said objects;

at least one of said field applying step and measuring step being varied to distinguish said objects.

2. A method according to claim 1 further including:

estimating an initial location and size of at least one of said objects;

calculating a perturbation distribution for said one of said objects for said applied background field;

comparing said measured distribution for said one object to said calculated distribution; and iterating said estimating, calculating, and comparing steps to convergence with said calculated distribution being substantially equal to said measured distribution.

3. A method according to claim 2 wherein said estimating step utilizes magnitude and spatial width of said measured perturbations to estimate location and size of said object.

4. A method according to claim 3 wherein said magnitude has different polarity and values above and laterally from said object.

5. A method according to claim 4 further comprising a plurality of said objects.

6. A method according to claim 5 wherein said objects are arranged in a layer.

7. A method according to claim 6 wherein said objects are arranged in a plurality of different layers.

8. A method according to claim 7 wherein a top layer closest to said surface is measured first for said perturbations, and iterated to convergence prior to detecting another layer.

9. A method according to claim 1 further comprising measuring magnitude of said perturbations spatially along a line to locate at least one of said objects by depth and lateral position, and to determine size of said one object and comparing said measured size to a reference size for said one object to determine any reduction in size thereof.

10. A method according to claim 1 further comprising applying said background field periodically to induce temporary eddy currents in at least one of said objects effecting temporal variations of said perturbations, and measuring said temporal variations to detect said one object.

11. A method according to claim 10 further comprising measuring magnitude and direction of said perturbations to locate said object by depth and lateral position.

12. A method according to claim 10 further comprising measuring rate of change of said perturbations.

13. A method according to claim 10 further comprising periodically interrupting application of said background field and measuring said temporal variations of said perturbations during said interruptions to increase discrimination of said perturbations relative to said non-interrupted background field.

14. A method according to claim 13 further comprising comparing rate of decay of said perturbations during said background field interruptions with a reference rate of decay to determine condition of said object including at least one of size, corrosion, and cracking.

15. A method according to claim 1 for detecting an elongate object concealed in said matrix comprising:

inducing said applied background magnetic field as an elongate magnetic field into said matrix;

moving said magnetic field over said matrix to effect a low reluctance magnetic circuit with at least one said object upon longitudinal alignment therewith; and sensing said elongate magnetic field to detect an increase therein upon said alignment indicative of said one object.

16. A method according to claim 15 further comprising aligning a first portion of said induced magnetic field with a known location of a portion of said one object, and laterally moving a remaining portion of said magnetic field to effect said magnetic circuit upon alignment with said object.

17. A method according to claim 1 wherein said objects are arranged in a layer, and including measuring magnitude and direction of said perturbations to locate said objects by depth and lateral position.

18. A method according to claim 1 wherein the measurement of said perturbations is made spatially along a line to locate the objects by depth and lateral position, and to determine sizes of said objects.

\* \* \* \* \*